United States Patent
Pasquier et al.

(10) Patent No.: US 9,615,496 B2
(45) Date of Patent: Apr. 11, 2017

(54) CUTTING UNIT HAVING ROTATABLY MOUNTED DEBRIS STRIPPING DEVICE

(71) Applicant: Kverneland Group Les Landes Genusson S.A.S., Les Landes Genusson (FR)

(72) Inventors: Gaetan Pasquier, Saint Philbert du Pont Charrault (FR); Arnaud Sechet, La Boissiere de Montaigu (FR)

(73) Assignee: Kverneland Group Les Landes Genusson S.A.S., Les Landes Genusson (FR)

( * ) Notice: Subject to any disclaimer, the term of this patent is extended or adjusted under 35 U.S.C. 154(b) by 0 days.

(21) Appl. No.: 14/795,919

(22) Filed: Jul. 10, 2015

(65) Prior Publication Data

US 2016/0021811 A1 Jan. 28, 2016

(30) Foreign Application Priority Data

Jul. 23, 2014 (EP) .................................... 14178224

(51) Int. Cl.
*A01B 23/06* (2006.01)
*A01B 71/08* (2006.01)
*A01B 21/08* (2006.01)

(52) U.S. Cl.
CPC .............. *A01B 23/06* (2013.01); *A01B 21/08* (2013.01); *A01B 21/086* (2013.01)

(58) Field of Classification Search
USPC .................... 172/66, 558, 559, 606; 404/129
IPC ..................... A01B 15/16,21/086, 23/06, 71/08
See application file for complete search history.

(56) References Cited

U.S. PATENT DOCUMENTS

| | | | | |
|---|---|---|---|---|
| 269,096 | A | 12/1882 | Niles | 172/185 |
| 4,502,547 | A * | 3/1985 | MacIntyre | A01B 15/18 111/140 |
| 4,603,746 | A * | 8/1986 | Swales | A01B 15/16 111/164 |
| 4,844,174 | A | 7/1989 | Zimmerman | 172/538 |
| 5,507,351 | A * | 4/1996 | Martin | A01B 15/16 111/139 |
| 5,626,196 | A * | 5/1997 | Hughes | A01C 5/064 111/191 |
| 7,997,218 | B2 * | 8/2011 | Gengler | A01C 5/064 111/164 |
| 2008/0000657 | A1 * | 1/2008 | Cooper | A01B 15/16 172/565 |

FOREIGN PATENT DOCUMENTS

EP 1407652 4/2004 ............... A01C 5/06

* cited by examiner

*Primary Examiner* — Gary Hartmann
(74) *Attorney, Agent, or Firm* — Kusner & Jaffe

(57) ABSTRACT

A cutting unit for a disc harrow and/or a seed coulter. The cutting unit includes a cutting blade rotatably mounted about a rotation axis, and a stripping device for stripping earth accumulated on the cutting blade, wherein the stripping device has at least one stripping arm rotatably mounted about the rotation axis.

12 Claims, 5 Drawing Sheets

CUTTING UNIT HAVING ROTATABLY MOUNTED DEBRIS STRIPPING DEVICE

FIELD OF THE INVENTION

The present invention relates to a cutting unit.

BACKGROUND OF THE INVENTION

Cutting units for a disc harrow are generally known. For example, from the publication EP 1 407 652 B 1 a cutting unit for a disc harrow is known, in which the stripping device is constructed as a disc which is rotatable about a rotation axis inclined to the rotation axis of the cutting blade. Through this inclination and the reduction, resulting thereby, of the distance between the disc and the cutting blade, an undesired blocking of the cutting blade occurs disadvantageously, particularly in the case of sticky soils.

It is an object of the present invention to provide a cutting unit, especially for a disc harrow or a seed coulter, which does not have the disadvantages of the prior art and in which in particular a blocking of the cutting blade can be prevented even in the case of heavy and/or sticky soils.

SUMMARY OF THE INVENTION

The abovementioned object is achieved by a cutting unit, especially for a disc harrow or a seed coulter, according to the present invention disclosed herein. With the cutting unit according to the invention, advantageously a blocking of the cutting blade can be prevented also in the case of sticky and/or heavy soils/earth.

It has namely been surprisingly found that a stripping arm, which has smaller dimensions compared with the cutting blade or respectively with a disc, is substantially better suited for the stripping off of earth, because no earth, or only small quantities of earth can accumulate between the stripping arm and the cutting blade, whereby a blocking of the cutting blade can be prevented. The movement of the stripping arm, especially passing in an interrupted manner between the cutting blade and its holding bracket prevent the soil accumulation between the cutting blade and its holding bracket. The stripping arm in the sense of the present invention is a body constructed in an elongated manner along a longitudinal axis. Preferably, the stripping arm is constructed as a flat body, wherein the stripping arm is arranged such that its flat surface is arranged perpendicularly to the rotation axis. It is thereby achieved that its comparatively narrow edge points in the direction of travel, so that an improved stripping can be achieved. Alternatively, the at least one stripping arm can be constructed so as to be round, i.e. the stripping arm is constructed in the shape of a circular cylinder. Preferably, the at least one stripping arm is made from a spring steel, whereby a comparatively good flexibility and vibration capability of the stripping arm can be achieved.

The cutting blade, especially a cutting disc, can be constructed in a cup shape or flat. The cutting blade can be made from steel, for example. The cutting blade can have a toothing in particular on its outer edge on the circumferential side.

Advantageous embodiments and further developments of the invention can be seen from the subclaims, and from the description with reference to the drawings.

According to a preferred further development, provision is made that the at least one stripping arm is spaced at least 10 mm apart from the cutting blade. Through this minimum distance, it can advantageously be achieved that earth cannot accumulate between the cutting blade and its holding bracket, whereby a blocking of the cutting blade can be prevented.

According to another preferred further development, provision is made that the at least one stripping arm is arranged at least at its end parallel to the cutting blade. Through this parallelity, an accumulating of earth can be advantageously prevented.

According to another preferred further development, provision is made that the at least one stripping arm is arranged at least partially perpendicularly to the rotation axis. Through this perpendicular arrangement, the efficiency of the cutting unit, especially for a disc harrow, can be considerably improved.

According to another preferred embodiment, provision is made that the at least one stripping arm and the cutting blade are rotatable uniformly about the rotation axis. For this, the stripping arm can be connected with the cutting blade in a tongue proof manner. Thereby, the stripping arm and the cutting blade always rotate with the same angular speed. Thereby, advantageously an accumulating of earth can be prevented. In addition, the structure of the cutting unit, especially for a disc harrow, can be considerably simplified. Alternatively, provision can be made that the at least one stripping arm is rotatable about the rotation axis independently of the cutting blade. For this, the cutting unit, especially for a disc harrow, has its own bearing for the stripping arm. In this case, the stripping arm is rotated by the contact with the ground. Thereby, it is possible that the at least one stripping arm rotates at a different angular speed than the cutting blade. Advantageously, hereby the stripping of earth from the cutting blade can be improved.

According to another example embodiment, the stripping device has two stripping arms lying opposite one another with respect to the rotation axis. The two stripping arms are therefore arranged offset from one another by 180°. Through this double arrangement, the efficiency of the cutting unit, especially for a disc harrow, can be considerably improved. Provision can be made in particular that the two stripping arms are constructed identically. Thereby, the structure of the cutting unit, especially for a disc harrow, can be simplified considerably. In addition, provision can be made that the two stripping arms are constructed symmetrically to the rotation axis. Alternatively, provision can be made that the cutting unit, especially for a disc harrow, has three, four, five, six or more stripping arms, which again can be constructed symmetrically and/or identically.

According to another example embodiment, the at least one stripping arm is bent at its end in the direction of the cutting blade. Thereby, advantageously the distance of the stripping arm from the cutting blade can be reduced, so that an improved stripping of earth is possible. Preferably, the end of the stripping arm is bent along a bending line which can be arranged perpendicularly to the longitudinal axis of the stripping arm or for example at an angle of approximately 45° to the longitudinal axis of the stripping arm.

According to another example embodiment, the at least one stripping arm is wound around its longitudinal axis. Wound, in this case, means that the stripping arm can be constructed in a spiral shape around its longitudinal axis. According to another embodiment, the at least one stripping arm can be set on edge perpendicularly at its end in the direction of the cutting blade. In this case, set on edge perpendicularly means that the end is arranged at least partially at right-angles to the main plane of extent of the stripping arm, which is constructed flat.

According to another example embodiment, the at least one stripping arm extends from the rotation axis up to the outer edge of the cutting blade. Thereby, advantageously an improved stripping of earth from the cutting blade can be achieved.

According to another example embodiment, the longitudinal axis of the stripping arm has an angle to the radial direction of its rotation axis. Thereby, the lifting of soil when the stripping arm goes out of the soil is limited and helps to prevent blockages. Thereby, the stripping arm has a progressive entrance in the area between the cutting blade and its holding bracket.

Example embodiments of the present invention are illustrated in the drawings and are explained in further detail in the following description.

BRIEF DESCRIPTION OF THE DRAWINGS

There are shown schematically

DETAILED DESCRIPTION OF THE INVENTION

In the various figures, identical parts are always given identical reference numbers and are therefore generally also respectively only named or respectively mentioned once.

Figures 1, 2:
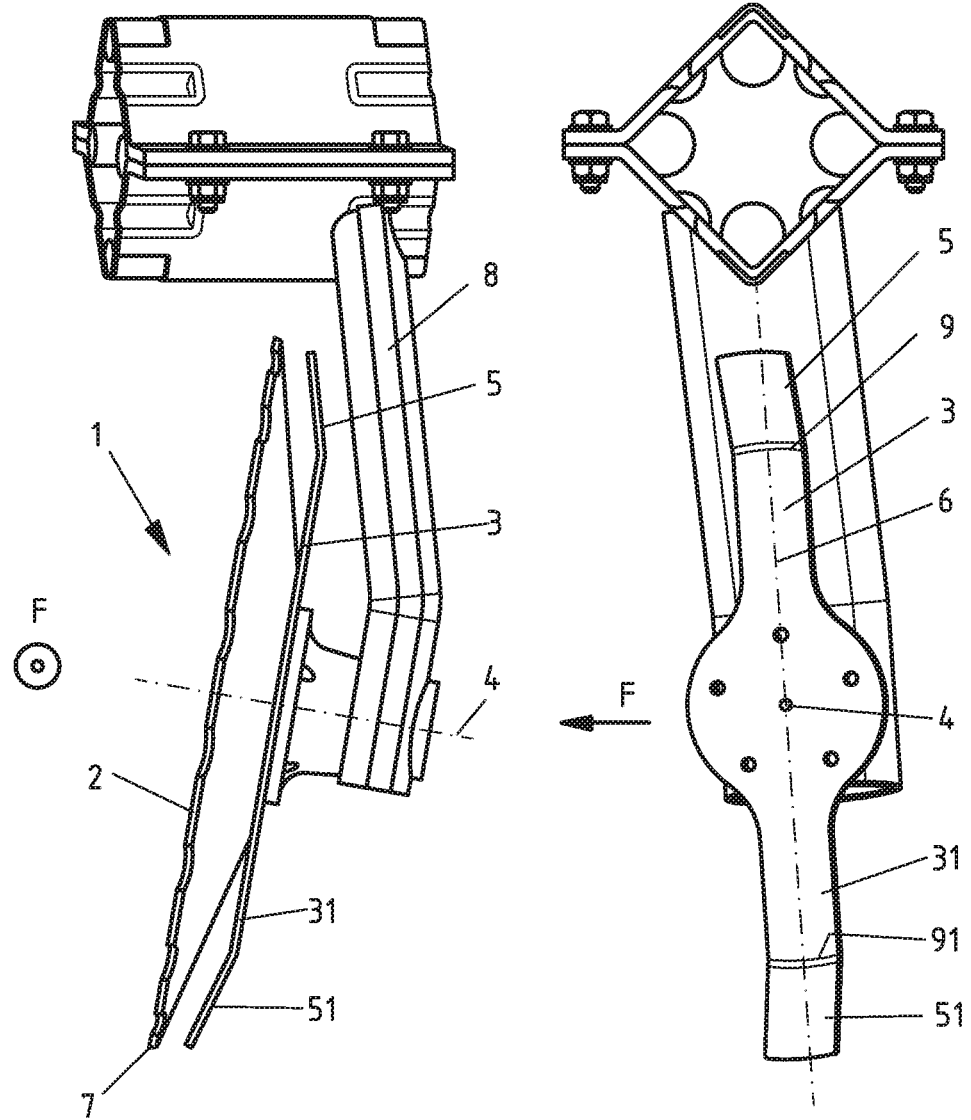
FIG. 1 illustrating a cutting unit, especially for a disc harrow, according to an example embodiment of the present invention, FIG. 2 illustrating the cutting unit of FIG. 1 in another view, FIG. 3 illustrating a cutting unit according to a further example embodiment, FIG. 4 illustrating the cutting unit of FIG. 3 in another view, FIG. 5 illustrating a cutting unit according to a further example embodiment, FIG. 6 illustrating the cutting unit of FIG. 5 in another view, FIG. 7 illustrating a cutting unit according to a further example embodiment, FIG. 8 illustrating the cutting unit of FIG. 7 in another view, FIG. 9 illustrating a cutting unit according to a further example embodiment, and FIG. 10 illustrating the cutting unit of FIG. 9 in another view.

FIG. 1 shows schematically a cutting unit 1 according to an example embodiment of the present invention in a view from the front or respectively parallel to the direction of travel F of a towing vehicle, which is not illustrated, on which the cutting unit 1 can be fastened. FIG. 2 shows schematically the cutting unit of FIG. 1 in a side view, wherein for clearer illustration the cutting blade 2 is not illustrated. In this example embodiment, the cutting unit 1 has a cup-shaped cutting blade 2. The cutting unit 1 is able to be fastened to the towing vehicle via a cutting unit mounting 8. The cutting unit 1 has, furthermore, two stripping arms 3, 31. The two stripping arms 3, 31 are constructed in a strip shape or respectively in an elongated manner and have a constant width. The stripping arms 3, 31 extend parallel to a longitudinal axis 6 which is arranged perpendicularly to a shared rotation axis 4. The cutting blade 2 and the stripping arms 3, 31 both rotate about the shared rotation axis 4, wherein the cutting blade 2 and the stripping arms 3, 31 are rotated uniformly. The stripping arms 3, 31 have ends 5, 51. The stripping arms 3, 31 extend with their ends 5, 51 up to an outer edge 7 of the cutting blade 2. The outer edge 7 delimits the outer circumference of the cutting blade 2 and in this embodiment is constructed in serrated form. The ends 5, 51 are bent along respectively a bending line 9, 91 in the direction of the cutting blade 2, wherein the bending lines 9, 91 are arranged perpendicularly to the longitudinal axis 6 of the stripping arms 3, 31. The ends 5, 51 are spaced apart from the cutting blade 2 at a distance of approximately 20 to 30 mm. In this embodiment, the stripping arms 3, 31 are constructed uniformly or respectively identically. In the operation of the cutting unit 1, it sits on the surface and the cutting blade 2 is set into a rotary movement about the rotation axis 4 by the movement in the direction of travel F. A furrow is produced in the ground or respective surface by the serrated outer edge 7 of the cutting blade 2. The two stripping arms 3, 31 also rotate together with the cutting blade 2 about the shared rotation axis 4. By the rotation of the stripping arms 3, 31, earth which has accumulated on the cutting blade 2 in operation, is detached, so that a blocking of the cutting blade 2 can be prevented. Through the comparatively small dimensions of the stripping arms 3, 31 compared with the cutting blade 2, and through the distancing of the stripping arms 3, 31 from the cutting blade 2, it can be prevented furthermore that earth can accumulate between the cutting blade 2 and the stripping arms 3, 31.

Figure 3:
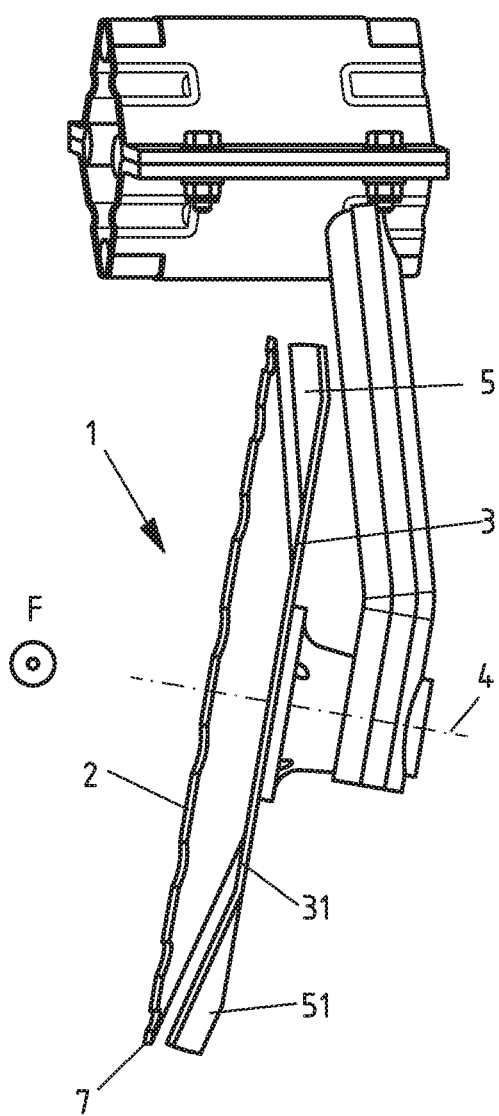
Figure 4:
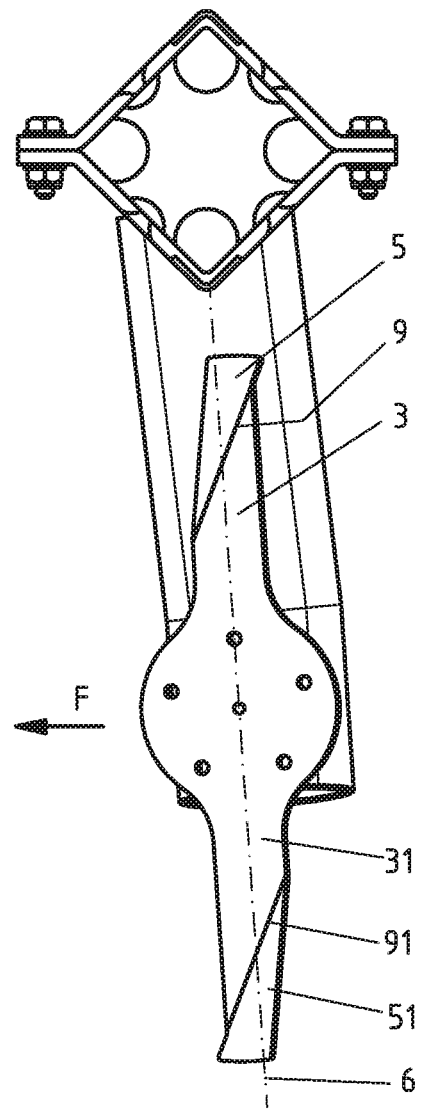

FIG. 3 shows schematically a cutting unit 1 according to another example embodiment, viewed from the front. FIG. 4 shows schematically the cutting unit 1 of FIG. 3 viewed from the side, wherein the cutting blade 2 is not shown, for better illustration. In this embodiment, the stripping arms 3, 31 have at their ends 5, 51 respectively an upturn, which are respectively bent about a bending line 9, 91 approximately perpendicularly in the direction of the cutting blade 2, wherein the bending lines 9, 91 are arranged at an angle of approximately 45° to the longitudinal axis 6. In this example embodiment, the ends 5, 51 are spaced apart from the cutting blade 2 at a distance of 11 to 15 mm in the region of the upturns. For the remainder, reference is to be made to the statements concerning FIGS. 1 and 2.

Figures 5, 6:
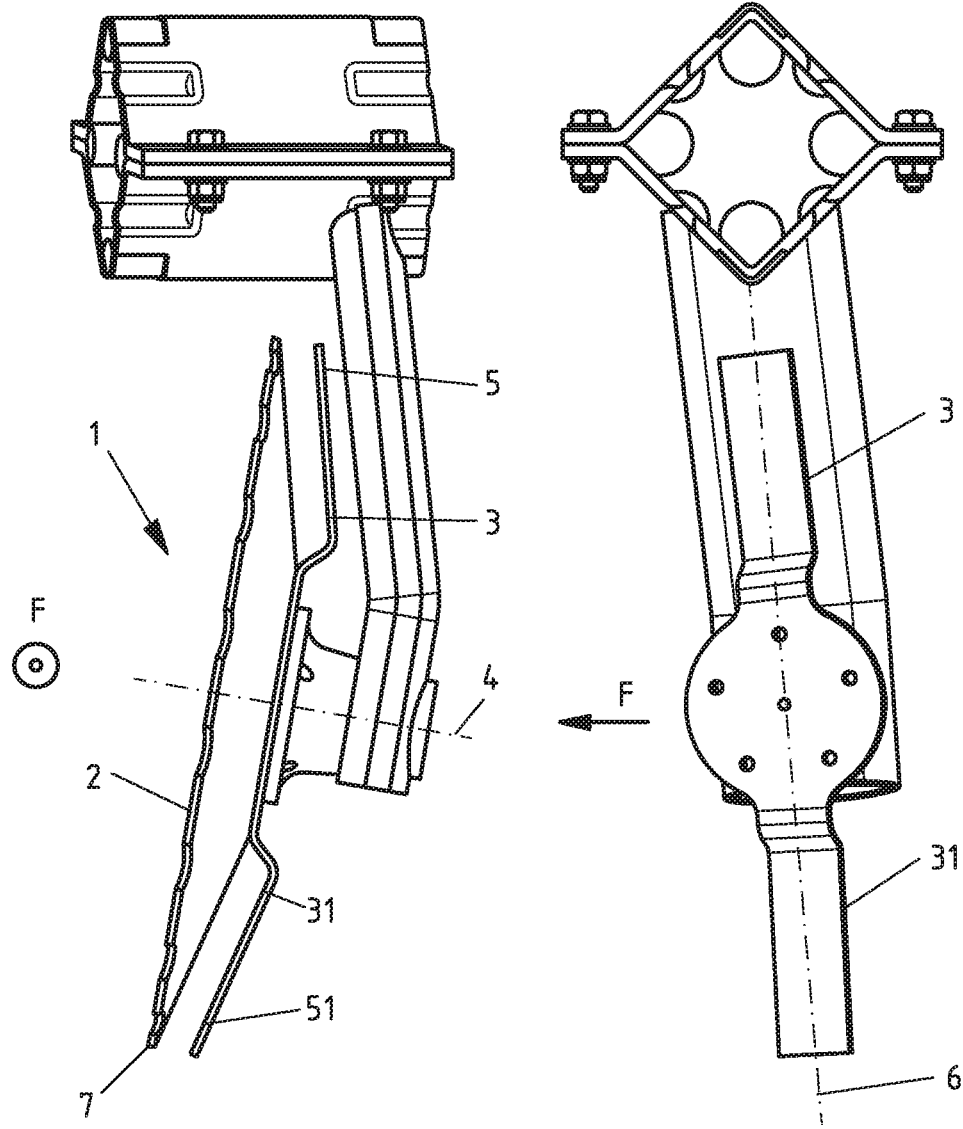

FIG. 5 shows schematically a cutting unit 1 according to another example embodiment viewed from the front. FIG. 6 shows diagrammatically the cutting unit 1 of FIG. 5 in a side view, wherein the cutting blade 2 has been omitted for clearer illustration. In this embodiment, the stripping arms 3, 31 run almost over their entire length along the longitudinal axis 6 parallel to the cutting blade 2. The distance between the stripping arms 3, 31 and the cutting blade 2 is e.g. approximately 24 to 26 mm. For the remainder, reference is to be made to the statements concerning FIGS. 1 to 4.

Figures 7, 8:
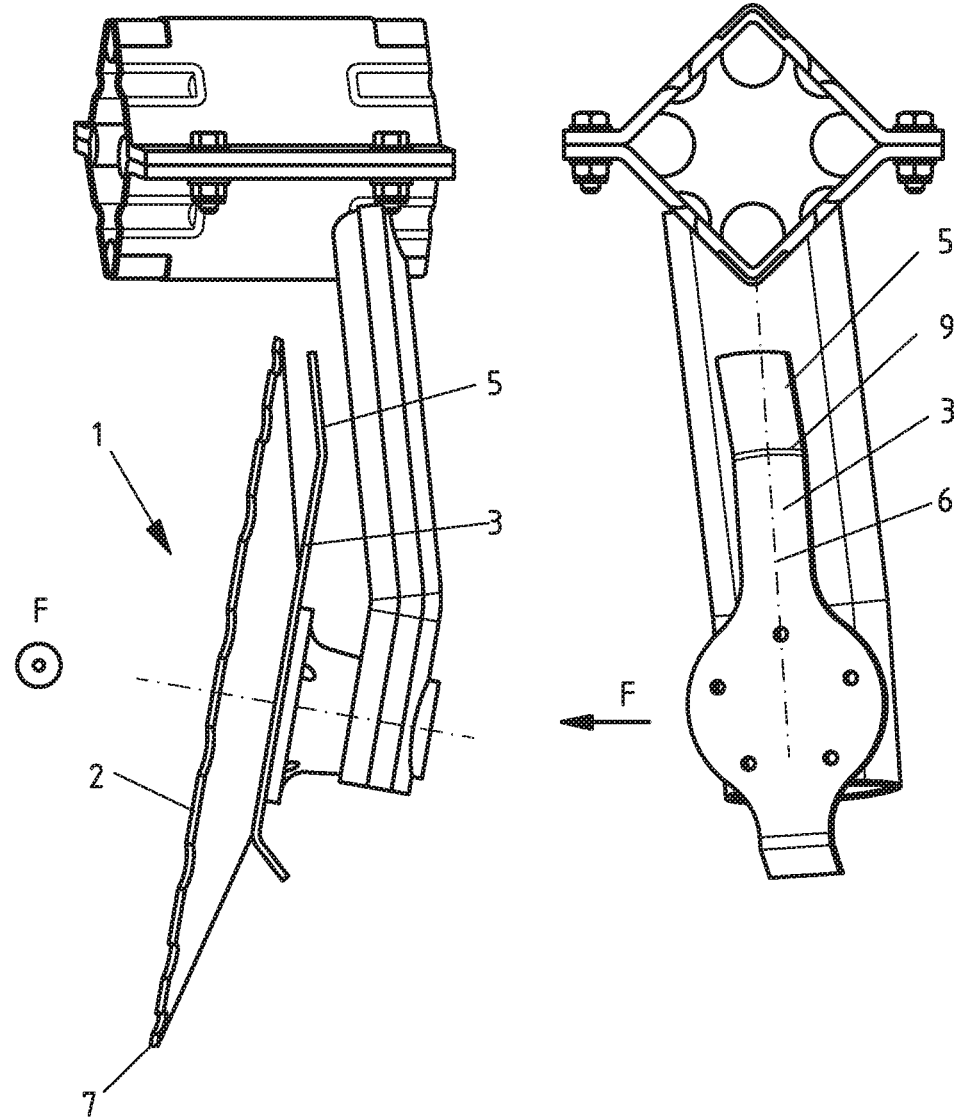

FIG. 7 shows schematically a cutting unit 1 according to another example embodiment viewed from the front. FIG. 8 shows diagrammatically the cutting unit 1 of FIG. 7 in a side view, wherein the cutting blade 2 has been omitted for better illustration. In this embodiment, the cutting unit 1 has only one stripping arm 3. The stripping arm 3 is bent in the direction of the cutting blade 2 at its end 5 along a bending line 9 which is arranged perpendicularly to the longitudinal axis 6. The end 5 extends parallel to the cutting blade 2, wherein the distance between the end 5 and the cutting blade 2 is between 23 and 25 mm. The distance between the end 5 and the cutting unit mounting 8 is e.g. approximately 24 to 26 mm. For the remainder, reference is to be made to the statements concerning FIGS. 1 to 6.

Figures 9, 10:
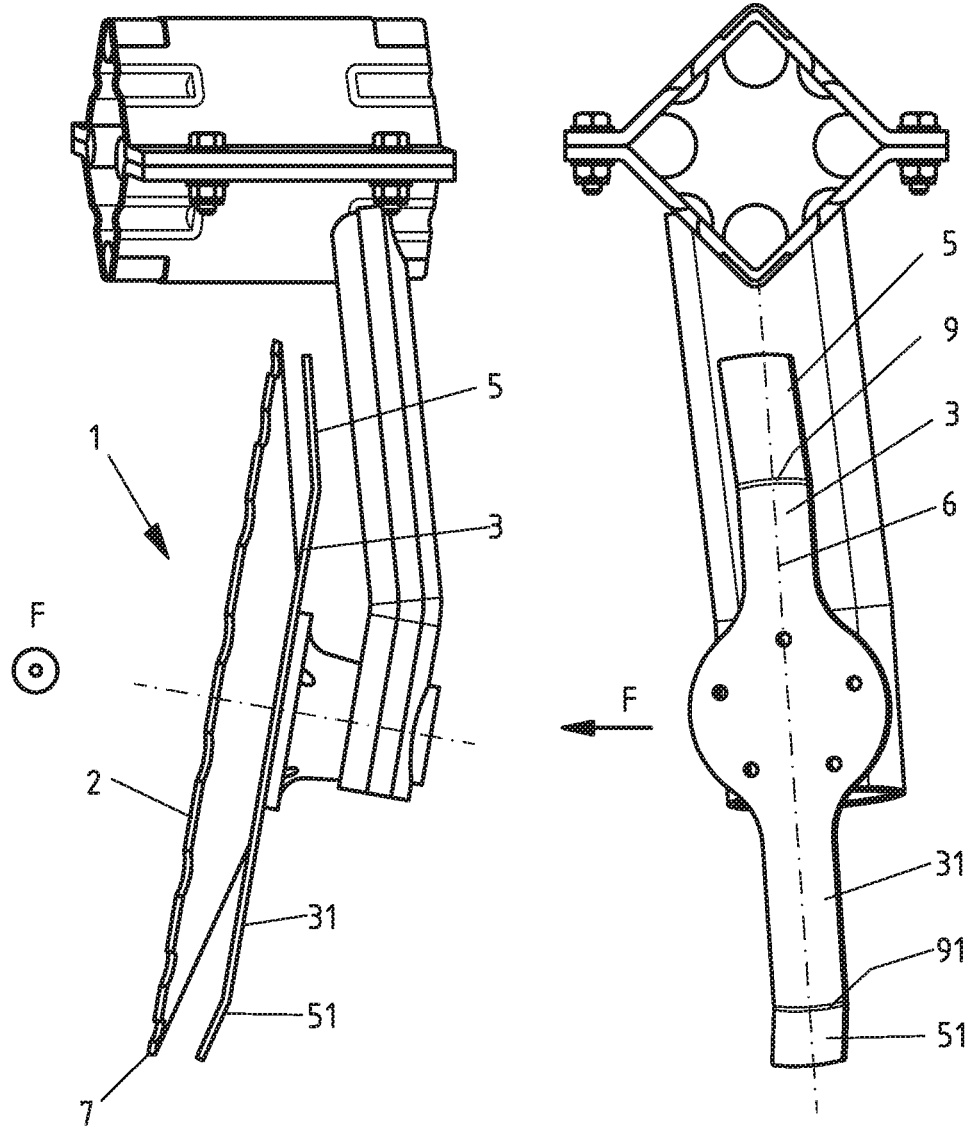

FIG. 9 shows schematically a cutting unit 1 according to another example embodiment in a view from the front. FIG. 10 shows diagrammatically the cutting unit 1 of FIG. 9 in a side view, wherein the cutting blade 2 has been omitted for better illustration. In this embodiment, the cutting unit 1 has two stripping arms 3, 31 lying opposite each other. The one stripping arm 3, which in this illustration is arranged above, is bent at its end 5 in the direction of the cutting blade 2 along a bending line 9 which is arranged perpendicularly to the longitudinal axis 6. The end 5 is arranged parallel to the cutting blade 2, wherein the distance between the end 5 and the cutting blade 2 is e.g. 16 to 18 mm. The other stripping arm 31, which in this illustration is arranged below, is bent at its end 51 in the direction of the cutting blade 2 along a bending line 91 which is arranged perpendicularly to the longitudinal axis 6. The two stripping arms 3, 31 differ from one another in that the end 5 of the upper arm 3 is approximately three times as long as the end 51 of the lower arm 31. For the remainder, reference is to be made to the statements concerning FIGS. 1 to 8.

The foregoing describes specific embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

LIST OF REFERENCE NUMBERS

1 cutting unit
2 cutting blade
3, 31 stripping arm
4 rotation axis
5, 51 end
6 longitudinal axis
7 outer edge
8 cutting unit mounting
9, 91 bending line
F direction of travel Having described the invention, the following is claimed:

1. A cutting unit for a disc harrow and/or a seed coulter, said cutting unit comprising:

a cutting blade rotatably mounted about a rotation axis, the cutting blade having a front side and a back side; and a stripping device, located proximate to the back side of the cutting blade, for stripping soil that accumulates on the cutting blade, wherein the stripping device has at least one stripping arm having a free end and being fully rotatable about the rotation axis independently of the cutting blade to strip soil accumulated on the cutting blade.

2. The cutting unit according to claim 1, wherein at least a portion of the at least one stripping arm is spaced at least 10 mm apart from the cutting blade.

3. The cutting unit according to claim 1, wherein the at least one stripping arm is arranged, at least at the free end, parallel to the cutting blade in a radial direction.

4. The cutting unit according to claim 1, wherein the at least one stripping arm is arranged at least partially perpendicular to the rotation axis.

5. The cutting unit according to claim 1, wherein the stripping device has two stripping arms extending opposite one another with respect to the rotation axis.

6. The cutting unit according to claim 5, wherein the two stripping arms are constructed identically.

7. The cutting unit according to claim 5, wherein the two stripping arms are constructed symmetric to the rotation axis.

8. The cutting unit according to claim 1, wherein the at least one stripping arm is bent at the free end in a direction toward the back side of the cutting blade.

9. The cutting unit according to claim 1, wherein the at least one stripping arm is set on edge perpendicularly at the free end in a direction toward the back side of the cutting blade.

10. The cutting unit according to claim 1, wherein the at least one stripping arm extends from the rotation axis up to an outer edge of the cutting blade.

11. The cutting unit according to claim 1, wherein the at least one stripping arm is made from a spring steel.

12. The cutting unit according to claim 1, wherein the stripping device is capable of stripping soil that accumulates at the back side of the cutting blade.

* * * * *